United States Patent
Wang et al.

(10) Patent No.: US 6,403,714 B1
(45) Date of Patent: Jun. 11, 2002

(54) PREPARATION OF EPOXY-FUNCTIONAL RESINS

(75) Inventors: Wei Wang, Boothwyn; Daniel B. Pourreau; Shao-Hua Guo, both of Exton, all of PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 0 days.

(21) Appl. No.: 09/819,466

(22) Filed: Mar. 28, 2001

(51) Int. Cl.$^7$ .................................................. C08F 8/00
(52) U.S. Cl. .................... 525/143; 525/298; 525/327.3; 526/273; 526/333
(58) Field of Search ................................ 526/273, 333; 525/143, 298, 327.3

(56) References Cited

U.S. PATENT DOCUMENTS

| | | | |
|---|---|---|---|
| 2,589,237 A | 3/1952 | Ellingboe | 260/87.5 |
| 2,687,405 A | 8/1954 | Rothrock et al. | 260/86.1 |
| 3,312,677 A | 4/1967 | Rosen | 260/80.5 |
| 3,450,681 A | 6/1969 | Gobran et al. | 260/80.72 |
| 3,527,738 A | 9/1970 | Pickle | 260/78.5 |
| 3,642,939 A | 2/1972 | Fellers et al. | 260/836 |
| 4,181,784 A | 1/1980 | Chattha et al. | 525/161 |
| 5,525,693 A | 6/1996 | Guo | 526/329.2 |
| 5,646,213 A | 7/1997 | Guo | 524/562 |
| 5,858,542 A | 1/1999 | Park et al. | 428/441 |

OTHER PUBLICATIONS

Shao–Hua Guo, "Bulk Free Radical Copolymerization of Allylic Alcohol with Acrylate and Styrene Comonomers," *American Chemical Society*, 1998, pp. 113–126.

Richard A. Hickner, Allan R. Meath, "Epoxy Resins," *Reaction Polymers, Chemistry ∎ Technology Applications ∎ Markets*, pp. 146–153.

Union Carbide Corporation, "UV Curing . . . More than a Solventless Technology," CYRACURE Cycloaliphatic Epoxides, 1999.

*Primary Examiner*—Robert Dawson
*Assistant Examiner*—D. Aylward
(74) *Attorney, Agent, or Firm*—Shao Guo

(57) ABSTRACT

A liquid epoxy-functional acrylic resin is disclosed. The resin comprises 10–90 wt % of recurring units of an epoxy-functional allylic monomer and 10–90 wt % of an acrylic monomer that has a homopolymer Tg less that 0° C. The epoxy-functional allylic monomer has the general structure:

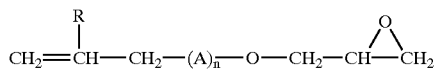

R is hydrogen, a $C_1$–$C_{10}$ aryl, or a $C_6$–$C_{12}$ aryl group; A is an oxyalkylene group; and n, which is an average number of oxyalkylene groups, is within the range of 0 to about 15.

19 Claims, No Drawings

PREPARATION OF EPOXY-FUNCTIONAL RESINS

FIELD OF THE INVENTION

The invention relates to liquid epoxy-functional resins. More particularly, the invention relates to epoxy-functional resins from epoxy-functional allylic monomers.

BACKGROUND OF THE INVENTION

Lowering resin molecular weight is a common approach to high-solids and low-VOC (Volatile Organic Compound) thermosetting acrylic coatings. This approach, however, is limited. When the resin molecular weight is reduced, so is its functionality (i.e., the number of functional groups per polymer chain). Thus, a hydroxyl-acrylic resin of reduced molecular weight often needs to be compensated by increasing the hydroxyl number to maintain high functionality. An increase in hydroxyl number, in turn, increases the solution viscosity due to inter-chain hydrogen bonding. Therefore, lowering the resin molecular weight, while increasing its hydroxyl number, cannot always achieve a higher-solids, or lower-VOC, coating.

Substituting allylic alcohol or alkoxylated allylic alcohol for hydroxyalkyl acrylate or methacrylate is another approach to high-solids and low-VOC hydroxyl acrylic resins. See, e.g., U.S. Pat. No. 5,525,693. These resins are characterized by an even distribution of hydroxyl groups. See S. Guo, *Solvent-Free Polymerization and Process,* ACS series book, 713, Chapter 7, pp.113–126 (1998). The even hydroxyl group distribution gives the resins a reduced amount of non-functional or mono-functional polymeric impurities. The non-functional or mono-functional polymers do not undergo crosslinking and, in effect, plasticize the coating. Hydroxyl acrylic resins produced with allylic alcohols or alkoxylated allylic alcohols have adequate functionality even at lower molecular weights. Thus, the coatings derived from these resins show both reduced VOC contents and high performance. See, e.g., U.S. Pat. No. 5,646,213. However, hydroxyl acrylic resins still have relatively high solution viscosities because of the hydrogen bonding.

Epoxy-functional acrylic resins are also known. For example, U.S. Pat. No. 4,181,784 teaches copolymers of an epoxy-functional monomer such as glycidyl acrylate or allyl glycidyl ether, ordinary acrylates such as methyl methacylate and butyl methacrylate, and vinyl aromatics such as styrene. The resins are prepared by solution polymerization at the refluxing temperature of the solvent. The resins are solid at ambient temperature.

U.S. Pat. No. 2,687,405 teaches copolymers of allyl glycidyl ether and acrylates. In one example, the patent teaches a copolymer of allyl glycidyl ether and n-octyl methacrylate. The polymerization is conducted at 60° C. for 16 hours. The monomer conversion is only 24%. The resin has very high molecular weight and broad molecular weight distribution. It is a semi-solid at ambient temperature.

New epoxy-functional resins are needed. The ideal epoxy-functional resins would be liquid at ambient temperature and could be used for formulating solvent-free or ultra-high solids coatings. More importantly, the resin could be efficiently prepared.

SUMMARY OF THE INVENTION

The invention is a liquid, epoxy-functional acrylic resin. The resin comprises 10–90 wt % of recurring units of an epoxy-functional allylic monomer and 10–90 wt % of recurring units of a $C_2$–$C_{10}$ alkyl acrylate or methacrylate that has homopolymer Tg (glass transition temperature) less than 0° C. The epoxy-functional allylic monomer has the general structure:

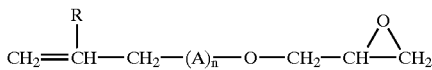

R is hydrogen, a $C_1$–$C_{10}$ alkyl, or a $C_6$–$C_{12}$ aryl group; A is an oxyalkylene group; and n is an average number of oxyalkylene groups, which is within the range of 0 to about 15. The epoxy-functional resins have a number average molecular weight (Mn) less than about 5,000, a weight average molecular weight (Mw) less than about 10,000, molecular weight distribution (Mw/Mn) less than about 3.5, and viscosity less than about 20,000 cps at 25° C.

The invention also includes a process for making a liquid epoxy-functional resin. The process comprises initially charging a reactor with an epoxy-functional allylic monomer, 0–50% of the total amount to be used of a $C_2$–$C_{10}$ alkyl acrylate or methacrylate that has homopolymer Tg less than 0° C., and 0–100% of the total amount to be used of a free-radical initiator. The remaining acrylic monomer and initiator are gradually added into the reactor during the course of polymerization. The polymerization is conducted at a temperature within the range of about 100° C. to about 185° C.

DETAILED DESCRIPTION OF THE INVENTION

The invention is a liquid epoxy-functional acrylic resin. By "liquid," we mean that the resin flows at 25° C. without solvent. The resin comprises 10–90 wt % of recurring units of an epoxy-functional allylic monomer. Preferably, the resin comprises 10–50 wt % of recurring units of an epoxy-functional allylic monomer.

The epoxy-functional allylic monomer has the general structure:

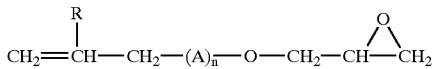

R is hydrogen, a $C_1$–$C_{10}$ alkyl, or a $C_6$–$C_{12}$ aryl group. Preferably, R is hydrogen or methyl group. A is an oxyalkylene group. Preferably, A is selected from the group consisting of oxyethylene, oxypropylene, oxybutene, and mixtures thereof. The n is an average number of oxyalkylene groups in the molecule, which is within the range of 0 to about 15. Preferably, n is within the range of 0 to about 5. More preferably, n is within the range of 0 to about 2. Epoxy-functional allylic monomers can be prepared, for example, by reacting epichlorohydrin with an allylic alcohol or alkoxylated allylic alcohol in the presence of a Lewis acid catalyst such as $BF_3$.

The liquid epoxy-functional acrylic resin also comprises 10–90 wt % of recurring units of a $C_2$–$C_{10}$, alkyl acrylate or methacrylate. Preferably, the resin comprises 50–90 wt % of recurring units of the acrylic monomer. Suitable acrylic monomers have homopolymer Tg (glass transition temperature) less than 0° C., preferably less than −10° C., and more preferably less than −20° C. Examples of suitable acrylic monomers are ethyl acrylate, 2-ethylbutyl acrylate, 2-ethylhexyl acrylate, n-octyl acrylate, 2-octyl acrylate, propyl acrylate, n-butyl acrylate, sec-butyl acrylate, lauryl acrylate, decyl methacrylate, 2-ethylhexyl methacrylate, hexyl methacrylate, n-octyl methacrylate, lauryl methacrylate, and the like, and mixtures thereof. It is essential to select an acrylic monomer that has homopolymer Tg below 0° C. because otherwise the resin produced is not a liquid at ambient temperature. 2-Ethylhexyl acrylate and n-butyl acrylate are preferred because they are commercially available and relatively inexpensive.

The resin has a number average molecular weight (Mn) less than about 5,000, weight average molecular weight (Mw) less than about 10,000, and molecular weight distribution less than about 3.5. Preferably, Mn is less than about 3,000 and Mw less than about 6,000. Preferably, Mw/Mn is less than about 2.5. The resin has a viscosity less than about 20,000 cps at 25° C. Preferably, the viscosity is less than 10,000 cps, and more preferably less than 5,000 cps at 25° C. The resin viscosity depends on the molecular weight and molecular weight distribution.

We have surprisingly found that a liquid epoxy-functional acrylic resin is obtained when the resin is designed according to the invention. See Examples 1–3. In contrast, the resins made according to the teachings of prior arts, e.g., U.S. Pat. No. 2,687,405, are solids or semi-solids. See Comparative Examples 4–5.

The invention includes a process for making liquid epoxy-functional acrylic resins. The process comprises initially charging a reactor with an epoxy-functional allylic monomer, 0–50% of the total amount to be used of an acrylic monomer and 0–100% of the total amount to be used of a free-radical initiator. Suitable epoxy-functional monomers and acrylic monomers are discussed above.

Suitable free-radical initiators include peroxides, hydroperoxides, azo compounds, and many others known to the polymer industry. Examples of suitable free-radical initiators are hydrogen peroxide, di-t-butyl peroxide, t-butyl hydroperoxide, cumene hydroperoxide, 2,2'-azobisisobutyronitrile, and the like, and mixtures thereof. The amount of initiator is preferably more than 1 wt %, more preferably more than 5 wt %, of the amount of resin produced. Increasing the amount of initiator can increase polymerization rate.

The remaining acrylic monomer and initiator are gradually added into the reactor during the course of polymerization. At least 50% by weight of the acrylic monomer is added to the reaction mixture gradually during the polymerization. Preferably, the acrylic monomer is added at a rate effective to maintain its steady, low concentration in the reaction mixture. Preferably, the ratio of the epoxy-functional allylic monomer to the acrylic monomer is essentially constant so that the resin produced has a relatively uniform composition. Gradual addition of the acrylic monomer enables the preparation of an epoxy-functional resin without the need of solvent.

All of the free-radical initiator may be added into the reactor before the polymerization starts. However, it is preferred to add at least 50 wt % of the total amount to be used of the initiator to the reactor gradually during the course of the polymerization. It is also desirable to match the addition rate of the free-radical initiator to the addition rate of the acrylic monomer, so that the resin produced has a uniform composition and molecular weight distribution. Gradual addition of the initiator can also increase the monomer conversion.

The polymerization is preferably conducted at a temperature greater than about 100° C. More preferably, the temperature is within the range of about 100° C. to about 185° C. Most preferably, the temperature is within the range of about 125° C. to about 155° C. Increasing temperature can increase the polymerization rate and the monomer conversion. However, it also increases the difficulty to control the process. In a laboratory process, a relatively low temperature is preferred for safety reasons.

The process of the invention differs from those known processes for making epoxy-functional acrylic resins in that the process makes it possible to make a liquid epoxy-functional resin. For example, using the process taught by U.S. Pat. No. 2,687,405, the resin produced is a semi-solid (Comparative Example 4), while the resin made by the process of the invention from the same monomers is a liquid (Example 3). Also, the process of the invention gives substantially higher yield (72% in Example 3 and only 28.9% in Comparative Example 4).

The epoxy-functional acrylic resins of the invention have many potential applications. They are versatile materials for coatings, adhesives, elastomers, and many other thermosetting polymers. They can be readily cured with, e.g., amines, polyamides, amidoamines, polysulfides, dicyandiamide, carboxylic acids, anhydrides, and phenolic resins. The curing agents are well known in the polymer industry. See *Reaction Polymers*, Ed. By W. F. Gum et al., Hanser Publishers, pp 146–153 (1992). The epoxy-functional acrylic resins are also UV-curable. The UV-curing agents or photoinitiators are known. See, e.g., Cyracure®, Cycloaliphatic Epoxides, a Technical Literature from Union Carbide Corporation, 1999. Alternatively, the epoxy-functional acrylic resins can react with acrylic or methacrylic acid to form epoxy-acrylate or epoxy-methacrylate oligomers. These oligomers can then be UV-cured in the presence of other acrylate monomers or oligomers to form thermosetting compositions. One advantage of the liquid epoxy-functional acrylic resins is that they can be used to formulate solvent-free thermosetting compositions.

The following examples merely illustrate the invention. Those skilled in the art will recognize many variations that are within the spirit of the invention and scope of the claims.

EXAMPLE 1

A 1-liter stainless steel reactor equipped with an agitator, a heating coil, a monomer addition pump and a nitrogen inlet is charged with allyl glycidyl ether (300 g). The reactor contents are purged with nitrogen for 30 minutes. n-Butyl acrylate (107 g) and t-amyl peroxy-2-ethylhexanoate (Trigonox™ 121, initiator, product of AKZO Nobel, 30 g) are mixed and charged into the addition pump. The reactor is initially charged with 42.5 grams of the mixture, and is heated to 145° C. The remaining mixture is added into the reactor over 5 hours as follows: first hour, 77.5 g; second hour, 70 g; third hour, 57.5 g; fourth hour, 47.5 g; and fifth hour, 35 g. The reaction is allowed to continue for an additional 30 minutes at 145° C. after the addition. The unreacted monomer is removed by vacuum distillation at 155° C. with nitrogen purging. The product (447 g) is collected (71% yield). The resulting resin has Mn: 1780, :Mw: 4475, glass transition temperature ($T_g$, by DSC): −35° C., and epoxy equivalent weight (EEW) 397. It is a liquid and has a viscosity of 4,930 cps at 25° C.

EXAMPLE 2

A reactor as described in Example 1 is charged with allyl glycidyl ether (400 g). The reactor contents are purged with nitrogen for 30 minutes. n-Butyl acrylate (300 g) and di-tert-butyl peroxide (35 g) are mixed and charged into the addition pump. The reactor is initially charged with 40 grams of the mixture and the reactor contents are heated to 145° C. The remaining mixture is added into the reactor over 5 hours as follows: first hour, 85 g; second hour, 72 g; third hour, 58 g; fourth hour, 46 g; and fifth hour, 34 g. The reaction is allowed to continue for an additional 30 minutes at 145° C. after the addition. The unreacted monomer is removed by vacuum distillation at 155° C. with nitrogen purging. The product (596 g) is collected (81% yield). The resulting resin has Mn: 1440, Mw: 3330, $T_g$: −49° C., and EEW: 252. It is a liquid and has a viscosity of 10200 cps at 25° C.

EXAMPLE 3

A reactor as described in Example 1 is charged with allyl glycidyl ether (150 g). The reactor contents are purged with nitrogen for 30 minutes. n-Octyl methacrylate (150 g) and Trigonox 121 (15 g) are mixed and charged into the addition pump. The reactor is initially charged with 22 grams of the mixture and the reactor contents are heated to 145° C. The remaining mixture is added into the reactor over 5 hours as follows: first hour, 36 g; second hour, 34 g; third hour, 30 g; fourth hour, 25 g; and fifth hour, 18 g. The reaction is allowed to continue for an additional 30 minutes at 145° C. after the addition. The unreacted monomer is removed by vacuum distillation at 155° C. with nitrogen purging. The product (227 g) is collected (72% yield). The resulting resin has Mn: 1690, Mw: 3220, $T_g$: −57° C., and EEW: 340. It is a liquid and has a viscosity of 6070 cps at 25° C.

COMPARATIVE EXAMPLE 4

A copolymer of allyl glycidyl ether and n-octyl methacrylate is prepared according to Example VI of U.S. Pat. No. 2,687,405. A reactor equipped with an agitator, a heating coil, and a nitrogen inlet is charged with allyl glycidyl ether (375 g), n-octyl methacrylate (125 g), and azodiisobutyronitrile (initiator, 5 g). The reactor contents are purged with nitrogen for 30 minutes, heated to 60° C., and held at this temperature for 16 hours. The unreacted monomers are removed under vacuum at 100° C. The product (146 g) is collected (only 28.9% yield). The resulting resin has Mn: 5960, Mw: 20900, Tg: −46° C. and EEW: 566. It is a semi-solid at 25° C.

COMPARATIVE EXAMPLE 5

A reactor as described in Example 1 is charged with allyl glycidyl ether (315 g). The reactor contents are purged with nitrogen for 30 minutes. Styrene (75 g), n-butyl acrylate (115 g), methyl methacrylate (180 g) and di-t-butyl peroxide (34 g) are mixed and charged into the addition pump. The reactor is initially charged with 36 grams of the mixture and is heated to 145° C. The remaining mixture is added into the reactor over 5 hours as follows: first hour, 87.5 g; second hour, 83 g; third hour, 74 g; fourth hour, 65.5 g; and fifth hour, 58 g. The reaction is allowed to continue for an additional 30 minutes at 145° C. after the addition. The unreacted monomer is removed by vacuum distillation at 155° C. with nitrogen purging. The product (523 g) is collected (72.7% yield). The resulting resin has Mn: 1593, Mw: 3820, $T_g$: −1.0° C., and EEW: 450. It is a solid at 25° C.

EXAMPLE 6

Solvent-Free Epoxy Coating Cured with Amine Hardener

Liquid epoxy-functional acrylic resin of Example 1 (20 g) is mixed with an amine hardener, HY283 Hardener (8.9 g, product of CIBA Chemical). The coating is drawn down on steel panels to a uniform wet thickness of 3 mils with a Bird type film applicator. The panels are baked in an oven at 130° C. for 30 minutes. The coating is expected to have high impact and good chemical resistance.

EXAMPLE 7

Solvent-Free Epoxy Coating Cured with Polyamidoamine Hardener

Liquid epoxy-functional acrylic resin of Example 1 (20 g) is mixed with a polyamidoamine hardener, HY955 Hardener (3.7 g, product of CIBA Chemical). The coating is drawn down on steel panels to a uniform wet thickness of 3 mils with a Bird type film applicator. The panels are baked in an oven at 130° C. for 30 minutes. The coating is expected to have high impact resistance and good adhesion.

EXAMPLE 8

UV-Cured Epoxy Coating

Liquid epoxy-functional acrylic resin of Example 1 (15 g) is mixed with a photoinitiator, Cyracure® UVI-6974 (1.0 g, product of Union Carbide Corporation). The coating is drawn down on steel panels to a uniform wet thickness of 3 mils with a Bird type film applicator. The panels are cured by exposure to UV light. The coating is expected to have high impact and good chemical resistance.

We claim:

1. An epoxy-functional resin comprising:
   (a) 10–90 wt % of recurring units of an epoxy-functional allylic monomer having the general structure:

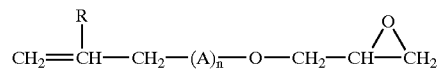

in which R is hydrogen, a $C_1$–$C_{10}$ alkyl, or a $C_6$–$C_{12}$ aryl group; A is an oxyalkylene group; and n, which is an average number of oxyalkylene groups, is within the range of 0 to about 15; and
   (b) 10–90 wt % of recurring units of a $C_2$–$C_{10}$ alkyl acrylate or methacrylate that has a homopolymer Tg (glass transition temperature) less than 0° C., wherein the epoxy-functional resin is a liquid at 25° C. and has a number average molecular weight less than about 5,000, a weight average molecular weight less than about 10,000, molecular weight distribution less than about 3.5, and viscosity less than about 20,000 cps at 25° C.

2. The epoxy-functional resin of claim 1 wherein the alkyl acrylate or methacrylate is selected from the group consisting of ethyl acrylate, 2-ethylbutyl acrylate, 2-ethylhexyl acrylate, n-octyl acrylate, 2-octyl acrylate, propyl acrylate, n-butyl acrylate, sec-butyl acrylate, lauryl acrylate, decyl methacrylate, 2-ethylhexyl methacrylate, hexyl methacrylate, n-octyl methacrylate, lauryl methacrylate, and mixtures thereof.

3. The epoxy-functional resin of claim 1 wherein the alkyl acrylate is n-butyl acrylate.

4. The epoxy-functional resin of claim 1 wherein the alkyl acrylate is 2-ethylhexyl acrylate.

5. The epoxy-functional resin of claim 1 wherein the alkyl methacrylate is 2-ethylhexyl methacrylate.

6. The epoxy-functional resin of claim 1 wherein the epoxy-functional allylic monomer has an average number of oxyalkylene groups within the range of 0 to about 5.

7. The epoxy-functional resin of claim 1 wherein the epoxy-functional allylic monomer has an average number of oxyalkylene groups within the range of 0 to about 2.

8. The epoxy-functional resin of claim 1 wherein the epoxy-functional allylic monomer is allyl glycidyl ether.

9. The epoxy-functional resin of claim 1 wherein the epoxy-functional allylic monomer is methallyl glycidyl ether.

10. The epoxy-functional resin of claim 1 having a viscosity at 25° C. less than 10,000 cps.

11. The epoxy-functional resin of claim 1 having a number average molecular weight less than about 3,000 and a weight average molecular weight less than about 6,000.

12. A thermosetting composition comprising:
  (a) the epoxy-functional resin of claim 1, and
  (b) a curing agent selected from the group consisting of amines, polyamides, amidoamines, polysulfides, dicyandiamide, carboxylic acids, anhydrides, and phenolic resins.

13. The thermosetting composition of claim 12 that contains no solvent.

14. An UV-cured coating comprising the epoxy-functional resin of claim 1.

15. An epoxy-acrylate made by reacting the epoxy-functional resin of claim 1 with acrylic acid or methacrylic acid.

16. A process for making an epoxy-functional resin, said process being conducted in the absence of solvent and comprising:
  (a) charging a reactor with
    (i) an epoxy functional allylic monomer having the general structure:

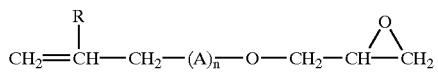

in which R is hydrogen, a $C_1$–$C_{10}$ alkyl, or a $C_6$–$C_{12}$ aryl group; A is an oxyalkylene group; and n, which is an average number of oxyalkylene groups, is within the range of 0 to about 15;
    (ii) 0–50% of the total amount to be used of an acrylic monomer having a homopolymer Tg less than 0° C.;
    (iii) 0–100% of the total amount to be used of a free-radical initiator; and
  (b) heating the reaction mixture at a temperature within the range of about 100° C. to about 185° C., and;
  (c) gradually adding to the reaction mixture, at a decreasing rate, the remaining acrylic monomer and free-radical initiator,
wherein the epoxy-functional resin produced is a liquid at 25° C. and it has a number average molecular weight less than about 5,000, a weight average molecular weight less than about 10,000, molecular weight distribution less than about 3.5, and viscosity less than about 20,000 cps at 25° C.

17. The process of claim 16 wherein the acrylic monomer is selected from the group consisting of ethyl acrylate, 2-ethylbutyl acrylate, 2-ethylhexyl acrylate, n-octyl acrylate, 2-octyl acrylate, propyl acrylate, n-butyl acrylate, sec-butyl acrylate, lauryl acrylate, decyl methacrylate, 2-ethylhexyl methacrylate, hexyl methacrylate, n-octyl methacrylate, lauryl methacrylate, and mixtures thereof.

18. The process of claim 16 wherein the acrylic monomer is n-butyl acrylate.

19. There process of claim 16 wherein the acrylic monomer is 2-ethylhexyl acrylate.

* * * * *